United States Patent [19]

Fujisaki et al.

[11] Patent Number: 5,327,365
[45] Date of Patent: Jul. 5, 1994

[54] GENERATING SYSTEM OF RANDOM-NUMBER SEQUENCES FOR A PARALLEL COMPUTER SYSTEM

[75] Inventors: Masahide Fujisaki; Motoi Okuda, both of Kawasaki, Japan

[73] Assignee: Fujitsu Limited, Kawasaki, Japan

[21] Appl. No.: 932,687

[22] Filed: Aug. 20, 1992

[30] Foreign Application Priority Data

Aug. 23, 1991 [JP] Japan .................... 3-211212

[51] Int. Cl.$^5$ .................... G06F 1/02
[52] U.S. Cl. .................... 364/717
[58] Field of Search .................... 364/717

[56] References Cited

U.S. PATENT DOCUMENTS

| | | | |
|---|---|---|---|
| 4,493,046 | 1/1985 | Watanabe | 364/717 |
| 4,667,301 | 5/1987 | Chiu et al. | 364/717 |
| 4,944,009 | 7/1990 | Micali et al. | 364/717 |
| 5,046,036 | 9/1991 | Tezuka | 364/717 |

OTHER PUBLICATIONS

Fushimi, Masanori, "Random Number Generation on Parallel Processors", *Proceedings of the 1989 Winter Simulation Conference*, Washington, D.C., pp. 459-461.
Durst, Mark J., "Using Linear Congruential Generators for Parallel Random Number Generation", *Proceedings of the 1989 Winter Simulation Conference*, Washington, D.C., pp. 462-466.
L'Ecuyer, Pierre, "Random Numbers for Simulation", *Communications of the Association for Computing Machinery*, vol. 33, No. 10, Oct. 1990, New York US, pp. 86-97.
Saarinen et al., "VLSI Implementation of Tausworthe Random Number Generator for Parallel Processing Environment", *IEE Proceedings E. Computers & Digital Techniques*, vol. 138, No. 3, May 1991, Stevenage GB, pp. 138-146.

*Primary Examiner*—Long T. Nguyen
*Attorney, Agent, or Firm*—Staas & Halsey

[57] ABSTRACT

In a parallel computer system comprising a plurality of processor elements, a parent processor element generates random-number initial values, and distributes the random-number initial values to child processor elements using a communication mechanism or a shared memory; and child processor elements conduct processing to generate random-number sequences in accordance with the maximum length shift register sequence (M-sequence) method using the distributed random-number initial values as seeds.

17 Claims, 12 Drawing Sheets

FIG. 7

| USED PE NUMBER | RANDOM-NUMBER INITIAL VALUES |
|---|---|
| PE FOR NO. 1 | $A_1, A_{k+1}, A_{2k+1}, \cdots, A_{(P-1)K+1}, A_{(PV-1)K+1}$ |
| PE FOR NO. 2 | $A_2, A_{k+2}, A_{2k+2}, \cdots, A_{(P-1)K+2}, A_{(PV-1)K+2}$ |
| PE FOR NO. i | $A_i, A_{k+i}, A_{2k+i}, \cdots, A_{(P-1)K+i}, A_{(PV-1)K+i}$ |
| PE FOR NO. k | $A_k, A_{2k}, A_{3k}, \cdots, A_{PK}, \quad A_{PVK}$ |

FIG. 9

① ⎡ PARAMETER (k=2**10)
   │ PARAMETER (p=284)
   │ PARAMETER (q=143)
   │ PARAMETER (v=2**2)
   │ PARAMETER (lp=p*v*k)
   │ PARAMETER (lq=q*v*k)
   │ INTEGER*4 IRANSU (lp+2*lq)
   │ DATA IX/FF00/
   │ DATA IY/00FF/
   ⎣ TANE = 4999

② ⎡ DO 10 I = 1, lp*2
   │     TANE = TANE*13731
   ⎣ 10  IRANSU (I) = TANE

③ ⎡ DO 20 I = 1, lp
   ⎣ 20  IRANSU (I) = I OR (IAND (IRANSU (I), IX), IAND (IRANSU (I+lp), IY))

④ ⎡ DO 30 I = lp+1, lp+lq*2
   ⎣ 30  IRANSU (I) = XOR (IRANSU (I-lp), IRANSU (I-lq))

FIG. 10

CALL SEND (IRANSU (lq*2+1, lp*4))

FIG. 11

① ┌ PARAMETER (p = 284)
　 ├ PARAMETER (v = 2**2)
　 └ INTEGER*4 IR (p*v)

② — CALL GETCID (ncid)

③ — CALL GETNPE (k)

④ — CALL RECV (IR, ncid*4, k*4, 4, 4, 0, 0, 1, p*v)

FIG. 12

①
- PARAMETER (ma = 3)
- PARAMETER (p = 284)
- PARAMETER (q = 143)
- PARAMETER ( v = 2**2)
- INTEGER*4 IR (p*v)
- INTEGER*4 JR(512*ma)

②
- DO 1000 IS = 1, ma
- DO 2000 I = p*v+512*(IS-1)+1,p*v+512*IS
- IR(I) = XOR (IR(I-p*v), IR(I-q*v))
- ③ — JR(I-p*v) = IRL(IR(I), 1)
- 2000 CONTINUE
- 1000 CONTINUE

GENERATING SYSTEM OF RANDOM-NUMBER SEQUENCES FOR A PARALLEL COMPUTER SYSTEM

BACKGROUND OF THE INVENTION

1. Field of the Invention

This invention relates to a generating system of random-number sequence for a parallel computer system in which each processor element comprising a parallel computer system can generate, at high speed, long-period random-number sequences having different lists.

2. Description of the Prior Art

A data processing system is required to generate, at high speed, long-period random-number sequences, such as used in computer simulations relying on the Monte Carlo method. In recent years, on the other hand, data processing systems comprising parallel computer systems have been widely used to enhance data processing capabilities. This trend has created the need for each processor element of a parallel computer system to generate, at high speed, longer-period random-number sequences having different lists.

Improvements that have heretofore been made, however, are largely directed toward the high-speed generation of random-number sequences on a single vector processor, but few proposals have been made about the method of generating random-number sequences in a parallel computer system.

It is against this background that P. Fredrickson et al. have recently proposed a concept about the method of generating random-number sequences in a parallel computer system (Fredrickson, P., et al., "Pseudo-random trees in Monte Carlo," Parallel Computing, Vol. 1, No. 2 1984, 175-180). On the basis of the concept of pseudo-random trees, this proposal implements the generation of randon-number sequences, as a parent processor generates seeds for random-number generation in accordance with the multiplicative or mixed congruential sequence (hereinafter referred to MC-sequence) method using pseudo-random trees, and distributes the seeds to child processors, which in turn generate random-number sequences in accordance with the multiplicative or mixed congruential sequence (MC-sequence) method.

The method of generating random-number sequences proposed by P. Fredrickson et al., which can generate random-number sequences in each processor of a parallel computer system, however, has a drawback in that it can generate only shorter-period random-number sequences because it is based on the multiplicative or mixed congruential sequence method. In a 32-bit computer, for example, only random-number sequences having at most a period of ($2^{32}-1$) can be generated.

In random-number sequence generation, it is very important to prevent random-number sequences generated by each processor from being correlated with each other. The method of generating random-number sequences proposed by P. Fredrickson et al., however, has a difficulty in determining coefficient values used for generating pseudo-random trees to prevent this correlation because it imposes additional complex limitations on the coefficient values.

SUMMARY OF THE INVENTION

It is therefore an object of this invention to enable each processor comprising a parallel computer system to generate long-period random-number sequences.

It is another object of this invention to enable each of plural processors, comprising a parallel computer system, to generate random-number sequences that are not correlated with each other.

It is still another object of this invention to enable each processor comprising a parallel computer to generate random-number sequences at high speed.

To accomplish these objectives, this invention provides a generating system of random-number sequences for a parallel computer system in which each processor of the parallel computer system can generate long-period random-number sequences that are not correlated with each other.

BRIEF DESCRIPTION OF THE DRAWINGS

FIG. 7 shows an example of the method of distributing random-number initial values to be distributed by a parent processor element to child processor elements.

FIG. 5 shows a typical program for implementing the generation of random-number initial values to be executed by the parent processor element.

FIG. 10 shows a typical program for implementing the transfer of random-number initial values to be executed by the child processor elements.

FIG. 11 shows a typical program for implementing the receiving of random-number initial values to be executed by the child processor elements.

FIG. 12 shows a typical program for implementing the generation of random-number sequences to be executed by the child processor elements.

DETAILED DESCRIPTION OF THE EMBODIMENTS

Prior to the description of the embodiments of this invention, the prior art of generating random-number sequences as proposed by P. Fredrickson et al. is discussed, referring to FIGS. 13A and 13B.

Figure 13A:
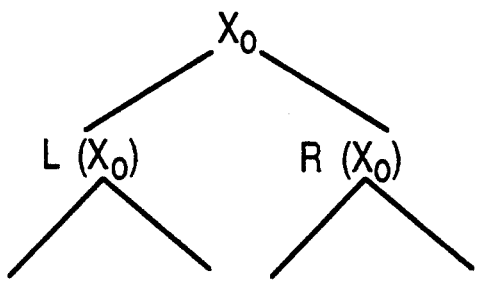
FIGS. 13A and 13B are diagrams of assistance in explaining the prior art.
Figure 13B:
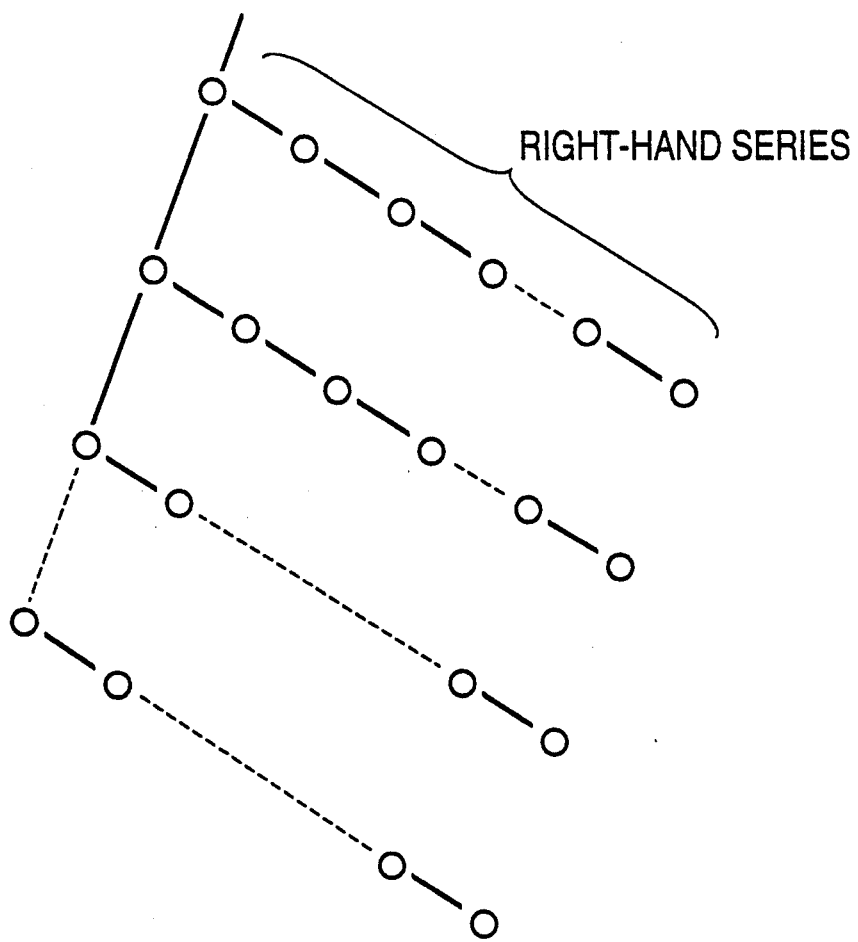

In the pseudo-random trees proposed by P. Fredrickson et al., it is assumed that X is a given element of the pseudo-random trees, and two elements L(X) and R(X) are defined as $$L(X) = (a_L X + c_L) \bmod m$$

$$R(X) = (a_R X + c_R) \bmod m$$

where "x mod y" represents the remainder obtained by dividing an integer x by an integer y. If an initial value $X_0$ is given in accordance with this definition, a tree as shown in FIG. 13A is generated. The successors taken from the right side, starting from a given node of this tree, are called the right-hand series in the tree. A left-hand branch of a particular node, as shown in FIG. 13B, is taken up to form a new right-hand series, starting from the left-hand branch.

P. Fredrickson et al. proposed a method of generating random-number sequences from each processor on the basis of a method in which a parent processor generates elements constituting a left-hand branch, in accordance with the pseudo-random trees, and the generated elements are distributed to child processors, which in turn generate a right-hand series from the distributed elements.

However, since the method of generating random-number sequences proposed by P. Fredrickson et al. is in accordance with the mixed or multiplicative congruential sequence (MC-sequence) method, as noted earlier, only shorter-period random-number sequences can be generated, and strict limiting conditions have to be imposed to prevent sequences from being correlated with each other.

Figure 1:
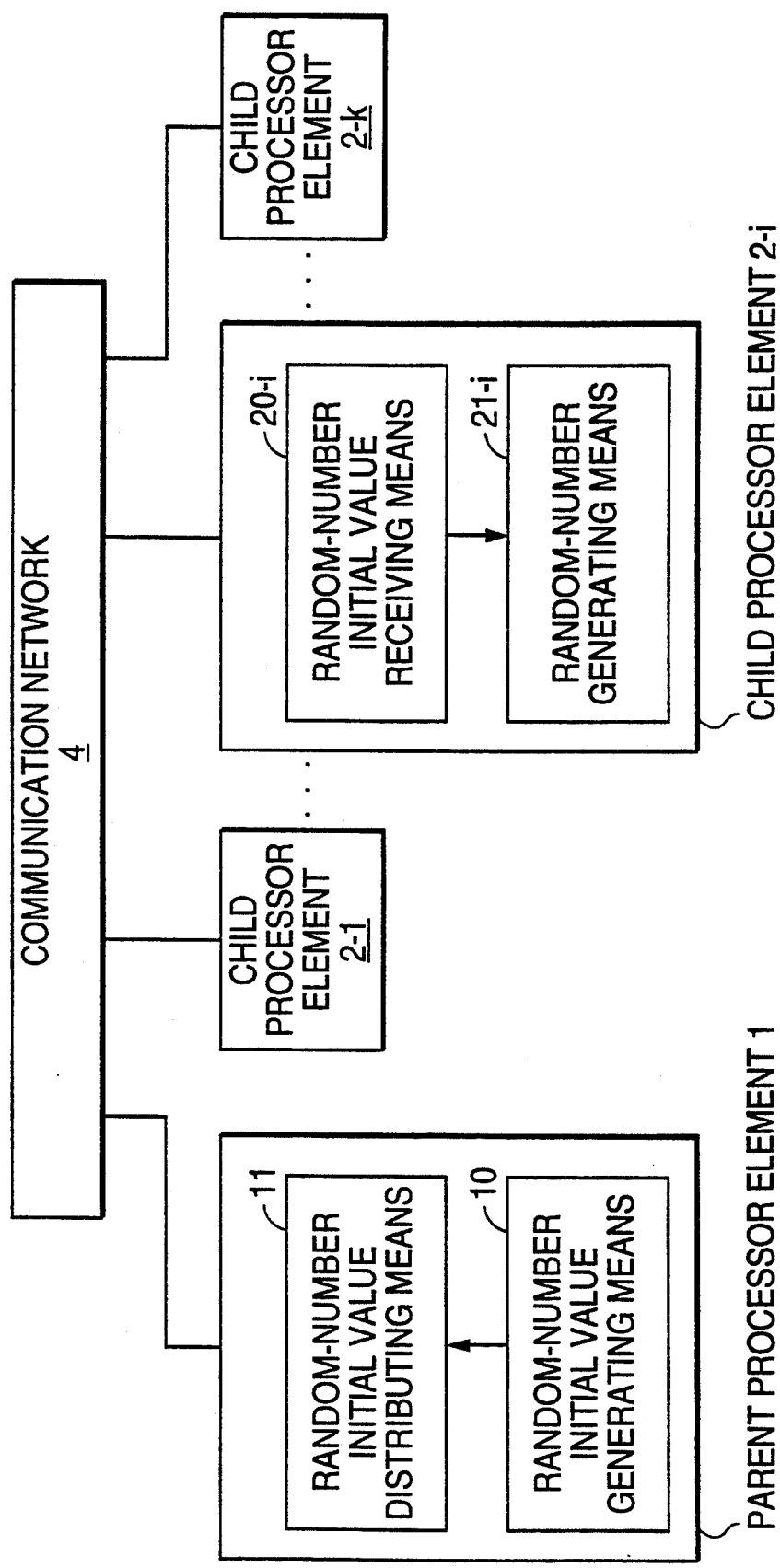
FIG. 1 is a diagram illustrating the operating principle of this invention.
Figure 2:
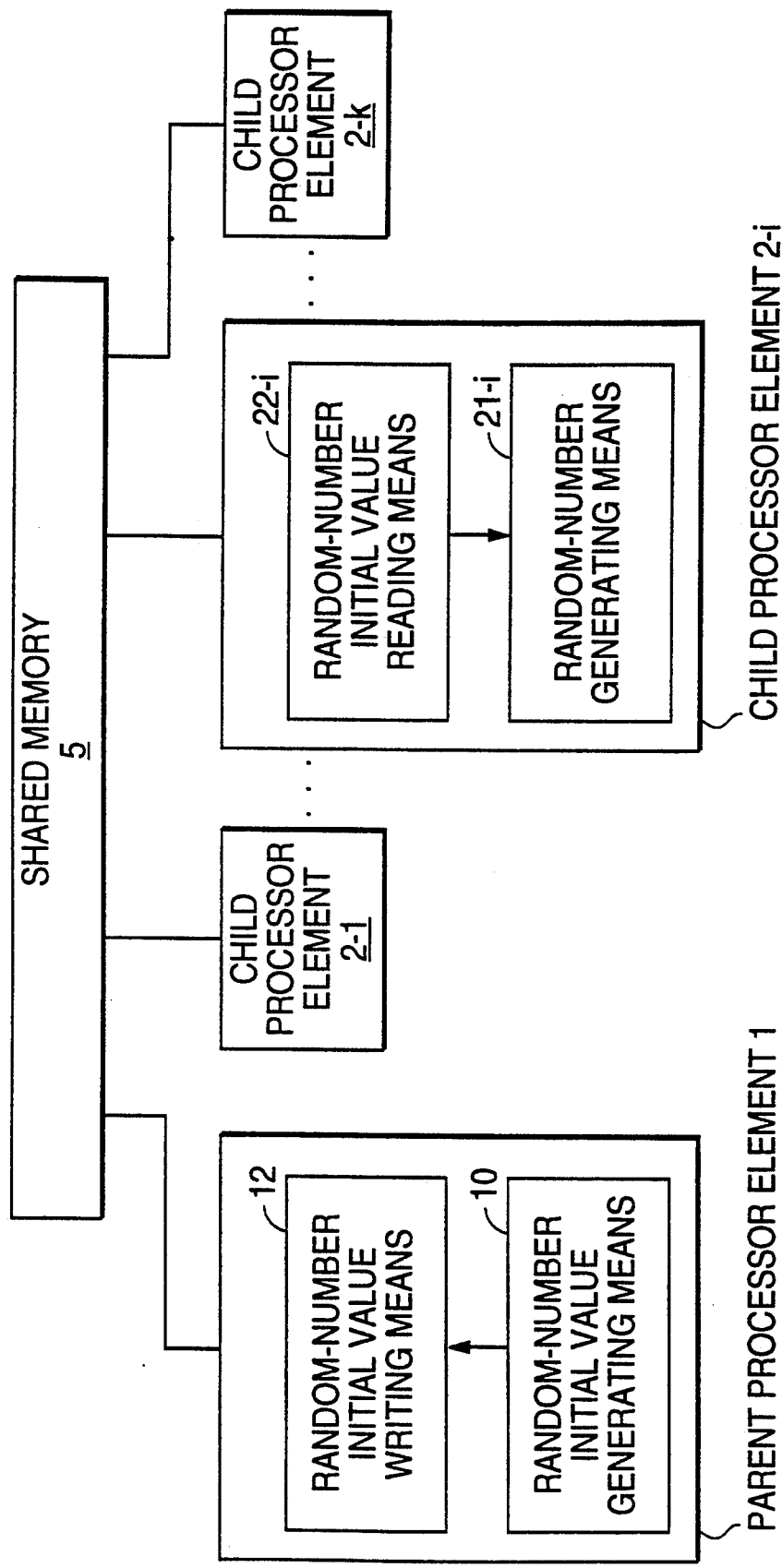
FIG. 2 is a diagram illustrating the operating principle of this invention.
Figure 3:
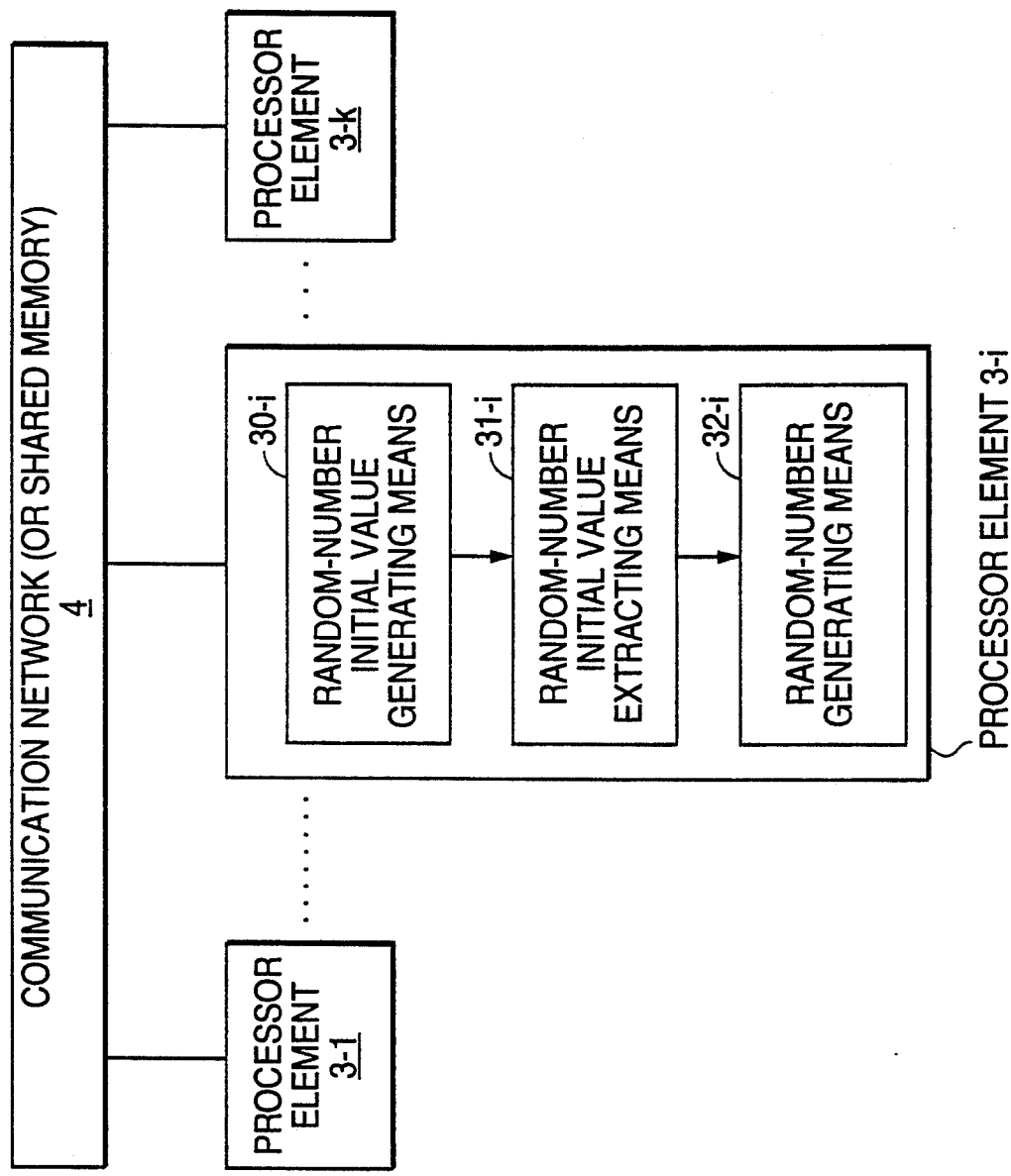
FIG. 3 is a diagram illustrating the operating principle of this invention.

Next, embodiments of this invention will be described. First, the outline of this invention will be described in accordance with embodiments illustrating the operating principles of this invention as shown in FIGS. 1 through 3. Then, this invention will be described in detail according to more specific embodiments.

FIG. 1 illustrates an embodiment showing the operating principle of this invention applied to a distributed memory type parallel computer system. Reference numeral 1 refers to a parent processor element; 2-$i$ ($1 \leq i \leq k$) to child processor elements; and 4 to a communication network. In the configuration shown in this figure, any one child processor element 2-$i$ may act as a parent processor element 1.

The parent processor element 1 comprises a means 10 for generating random-number initial values and a means 11 for distributing random-number initial values. The random-number initial value generating means 10 generates $p \times v \times k$ pieces of random-number initial values. The random-number initial values can be generated by the multiplicative or mixed congruential sequence (MC-sequence) method, or by the maximum length shift register sequence (hereinafter referred to as M-sequence) method, which will be described later, or by a combination of both. The generated random-number initial values may be essentially any values, other than 0. The random-number initial value distributing means 11 distributes $p \times v$ pieces, each of the random-number initial values generated by the random-number initial value generating means 10, to the child processor elements 2-$i$ via the communication network 4, avoiding overlapping.

Here, p is defined as a parameter of the primitive irreducible polynomial "$X^p + X^q + 1$" prescribing the M-sequence random-number sequence generation method (Tausworthe sequence); and v is defined as a value obtained by raising 2 to the n-th power (n=a natural number); or if the vector length of the vector operating mechanisms of the child processor elements 2-$i$ is expressed by $\alpha$, and q is expressed by a parameter of the aforementioned primitive irreducible polynomial, then v should preferably be a value satisfying the condition "$q \times v > \alpha$," or "$(p-q) \times v > \alpha$"; and k is the number of child processor elements 2-$i$ that generate random numbers. When the child processor elements 2-$i$ have no vector operating mechanisms, the value v is set to 1. Furthermore, v should preferably be the smallest value among those satisfying the aforementioned conditions to improve the efficiency of generating random-number initial values.

As for the M-sequence random-number sequence generating method, refer to I. Deák, Uniform random number generators for parallel computers, 15 (1990) 155-164.

A child processor element 2-$i$, on the other hand, comprises a random-number initial value receiving means 20-$i$ and a random-number generating means 21-$i$. The random-number initial value receiving means 20-$i$ receives random-number initial values distributed to its own (i.e., associated) element by the parent processor element 1. The random-number generating means 21-$i$ generates a new random-number value $A_n$ ($n \geq p \times v + 1$), using the random-number initial values received by the random-number initial value receiving means 20-$i$, more preferably, in accordance with the bit-by-bit logical operations of random-number values $A_{n-pv}$ and $A_{n-qv}$ when the parameter v satisfying the condition "$q \times v > \alpha$" is used, or in accordance with bit-by-bit logical operations for random-number values $A_{n-pv}$ and $A_{n-pv+qv}$ when the parameter v satisfying the condition "$(p-q) \times v > \alpha$."

Here, more desirably the condition "$q \times v > \alpha$" is required to be satisfied when "$q > (p-q)$" holds; and the condition "$(p-q) \times v > \alpha$" is required to be satisfied when "$q < (p-q)$" holds; further, the random-number generating means 21-$i$ more preferably uses an exclusive-OR operation as the bit-by-bit logical operation.

When employing this configuration, the random-number initial value generating means 10 of the parent processor element 1 generates $p \times v \times k$ pieces of random-number initial values, while the random-number initial value distributing means 11 distributes $p \times v$ pieces, each of the generated random-number initial values, to each child processor element 2-$i$, avoiding overlapping, that is, in a predetermined order or in accordance with a predetermined regularity, thereby to avoid overlapping. The random-number initial value receiving means 20-$i$ of each child processor element 2-$i$ receives random-number initial values distributed to its own element by the parent processor element 1, whereas the associated random-number generating means 21-$i$ generates random-number sequences using the received random-number initial values.

Random-number generating processing by this random-number generating means 21-$i$ is executed in accordance with the M-sequence random-number sequence generating method.

In the M-sequence method of random-number sequence generation, if exclusive-OR operations are used as the bit-by-bit logical operations and with p pieces of random-number initial values of $A_1$ and $A_p$ given, random-number sequences from the term (p+1) and thereafter are generated in accordance with the following recurrence formula derived from the primitive irreducible polynomial "$X^p + X^q + 1$" (modulo 2):

$$A_n = \text{EOR}\, (A_{n-p}, A_{n-q}) \qquad \text{Eq. (1);}$$

Alternatively, random-number sequences from the term (p+1) and thereafter are generated in accordance with the following recurrence formula derived from a primitive irreducible polynomial "$X^p + X^{(p-q)} + 1$":

$$A_n = \text{EOR}(A_{n-p}, A_{n-p+q}) \quad \text{Eq.(2)}$$

since it has been proved that the primitive irreducible polynomial "$X^p + X^q + 1$" is equivalent to the "$X^p + X^{(p-q)} + 1$."

When Eq. (1) is used, in which $A_{p+k}$ is generated from $A_k$ and $A_{p+k-q}$, the number of random numbers that can be generated at one time using p pieces of random-number initial values $A_1 - A_p$ becomes "$k=q$" where "$p+k-q=p$" holds. When Eq. (2) above is used, on the other hand, in which $A_{p+k}$ is generated from $A_k$ and $A_{k+q}$, the number of random numbers that can be generated at one time using p pieces of random-number initial values $A_1 - A_p$ becomes "$k=(p-q)$" where "$k+q=p$" holds. That is, it is more desirable in terms of random-number generating efficiency to generate random numbers in accordance with Eq. (1) so long as "$q > (p-q)$" holds, and to generate random numbers in accordance with Eq. (2) so long as "$(p-q) < q$" holds.

In this way, the random-number generating means 21-$i$ can generate only q pieces of random numbers at one time when the recurrence formula of Eq. (1) is used. When the recurrence formula of Eq. (2) is used, only $(p-q)$ pieces of random numbers can be generated at one time. This poses some problems in that even if a vector operating mechanism has a capability of generating $\alpha$ pieces of random numbers at one time, that capability is never used if the value q or $(p-q)$ is smaller than the vector length $\alpha$ of the vector operating mechanism of the child processor elements 2-$i$, and thus random numbers cannot be generated at high speed.

Focussing an the fact that random number sequences from the term $(p \times v + 1)$ and thereafter can be generated in accordance with the following recurrence formula (eq. (3) as follows) derived from these primitive irreducible polynomials when $p \times v$ pieces of random-number initial values of $A_{01} - A_{pv}$ are given, since it has been proved that the primitive irreducible polynomial "$X^p + X^q + 1$" (modulo 2) is equivalent to "$(X^p + X^q + 1)^v$ (modulo 2)" or "$(X^p + X^{(p-q)} + 1)^v$ (modulo 2)":

$$A_n = \text{EOR}(A_{n-pv}, A_{n-rv}) \quad \text{Eq. (3)}$$

where $r = q$ or $(p-q)$ and EOR indicates a bit-wise exclusive-or operation

The EOR operation may be other logical operations. The random-number generating means 21-$i$ generates random numbers at high speed in accordance with the method of M-sequence random-number generation method.

That is, the random-number generating means 21-$i$ can generate $q \times v$ pieces of random numbers at one time from $p \times v$ pieces of random-number initial values of $A_1 - A_{pv}$ by using the recurrence formula of Eq. (3) with q used as the value r, as is evident from the description relating to Eq. (1) above, and thereafter random numbers can be efficiently generated in increments of $q \times v$ pieces. By using the recurrence formula of Eq. (3) with $(p-q)$ as the value r, on the other hand, $(p-q) \times v$ pieces of random numbers can be generated at one time from $p \times v$ pieces of random-number initial values of $A_1 - A_{pv}$, and thereafter random numbers can be efficiently generated in increments of $(p-q) \times v$ pieces, as is apparent from the description relating to Eq. (2) above.

Thus, the random-number generating means 21-$i$ generates random numbers at high speed in accordance with the M-sequence random-number sequence generating method, more preferably by generating random-number sequences from the term $(p \times v + 1)$ and thereafter, using the vector length $\alpha$ as a generation unit, in accordance with the recurrence formula of Eq. (3) where "$r = q$" holds by selecting such a value v that $q \times v$ can become larger than the vector length $\alpha$; or by generating random-number sequences from the term $(p \times v + 1)$ and thereafter, using the vector length $\alpha$ as a generation unit, in accordance with the recurrence formula of Eq. (3) where "$r = (p-q)$" holds by selecting such a value v that $(p-q) \times v$ becomes larger than the vector length $\alpha$.

Essentially, either of q or $(p-q)$ can be selected as r, but any smaller v value is more appropriate because the random-number initial value generating means 10 of the parent processor element 1 must generate $p \times v \times k$ pieces of random-number initial values. It follows from this that it is desirable to select q as r when "$q > (p-q)$" holds, and it is desirable to select $(p-q)$ as r when "$(p-q) > q$" holds.

Furthermore, as long as the condition "$r \times v > \alpha$" is met, any value obtained by raising 2 to the n-th power (n—a natural number) may be used as v, but it is similarly desirable to use the least value as v among those satisfying this condition since the random-number initial value generating means 10 of the parent processor element 1 must generate $p \times v \times k$ pieces of random-number initial values.

Furthermore, even if the condition "$r \times v > \alpha$" is not met, high-speed random-number generation can be accomplished if v assumes a value larger than 1 because the vector operating mechanisms of the child processor elements 2-$i$ are used more efficiently than with the v value being 1. Needless to say, when the condition "$r > \alpha$" is met from the very beginning, the value v is set to 1.

In this way, this invention employs such a configuration that each child processor element 2-$i$ generates random-number sequences in accordance with the M-sequence random-number sequence generating method.

An embodiment shown in FIG. 2 illustrates the operating principle of this invention when applied to a shared-memory type parallel computer system. In this embodiment, a shared memory 5 is used as a communication mechanism that can be accessed by both the parent processor element 1 and the child processor elements 2-$i$, in place of the communication network 4 used in the embodiment shown in FIG. 1.

In this embodiment, the parent processor element 1 comprises the random-number initial value generating means 10 described with reference to FIG. 1, and a new random-number initial value writing means 12, while a child processor element 2-$i$ comprises the random-number generating means 21-$i$ described with reference to FIG. 1, and a new random-number initial value reading means 22-$i$.

In this embodiment having such a configuration, the random-number initial value generating means 10 of the parent processor element 1 generates $p \times v \times k$ pieces of random-number initial values, while the random-number initial value writing means 12 writes $p \times v \times k$ pieces of the generated random-number initial values in the shared memory 5. The random-number initial value reading means 22-*i* reads p×v pieces, each of the p×v×k pieces of the random-number initial values being written in the shared memory 5 while avoiding overlapping with other child processor elements 2-*i*. The random-number generating means 21-*i* generates random-number sequences in accordance with the maximum length shift register sequence (M-sequence) method using p×v pieces of random-number initial values.

In this way, each child processor element 2-*i* of a parallel computer system generates random-number sequences in accordance with the M-sequence random-number sequence generating method.

The embodiment shown in FIG. 2 employs such a configuration that the parent processor element 1 generates random-number initial values, as in the embodiment shown in FIG. 1. This invention, on the other hand, can employ such a configuration that each processor element required to generate random-number generation generates random-number initial values by itself.

FIG. 3 illustrates the operating principle of an embodiment of this invention having such a configuration. In the figure, 3-*i* ($1 \leq i \leq k$) is a processor element required to generate random numbers.

In this embodiment having such a configuration, each processor element 3-*i* comprises a random-number initial value generating means 30-*i* having the same function as the random-number initial value generating means 10 described with reference to FIG. 1, a new random-number initial value extracting means 31-*i*, and a random-number generating means 32-*i* having the same function as the random-number generating means 21-*i* described in FIG. 1.

With this configuration, the random-number initial value generating means 30-*i* of each processor element 3-*i* generates p×v×k pieces of random-number initial values as in the case of the random-number initial value generating means 10 shown in FIG. 1; the random-number initial value extracting means 31-*i* extracts p×v pieces of the random-number initial values to be allocated to itself from among p×v×k pieces of the generated random-number initial values, avoiding overlapping with other processor elements 3-*i*; and the random-number generating means 32-*i* generates random-number sequences in accordance with the M-sequence random-number sequence generating method using the extracted random-number initial values.

In this way, each processor element 3-*i* of a parallel computer system generates random-number sequences in accordance with the M-sequence random-number sequence generating method. This configuration eliminates the need for executing communication processing for random-number generation among the processor elements 3-*i*. Consequently, this configuration can employ both a shared memory and a communication network.

In the following, this invention will be described in more detail, taking more specific examples of the embodiment shown in FIG. 1.

Figure 4A:
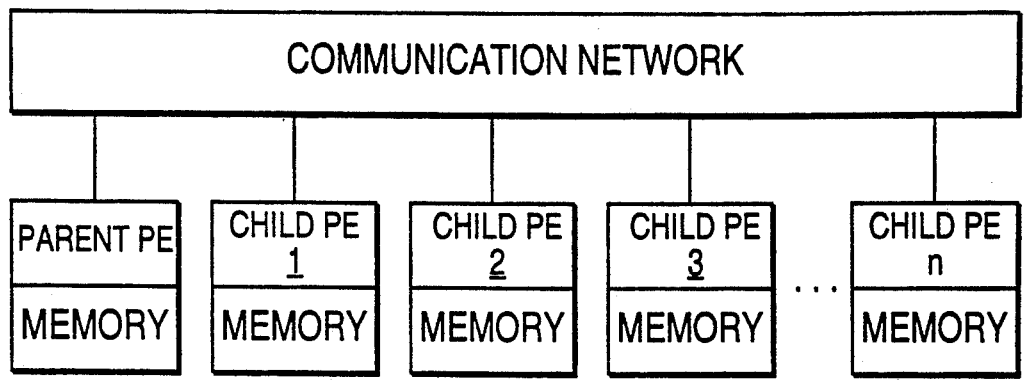
FIGS. 4A, 4B and 4C are diagrams of assistance in explaining a parallel computer system to which the generation of random-number sequences of this invention can be applied.
Figure 4B:
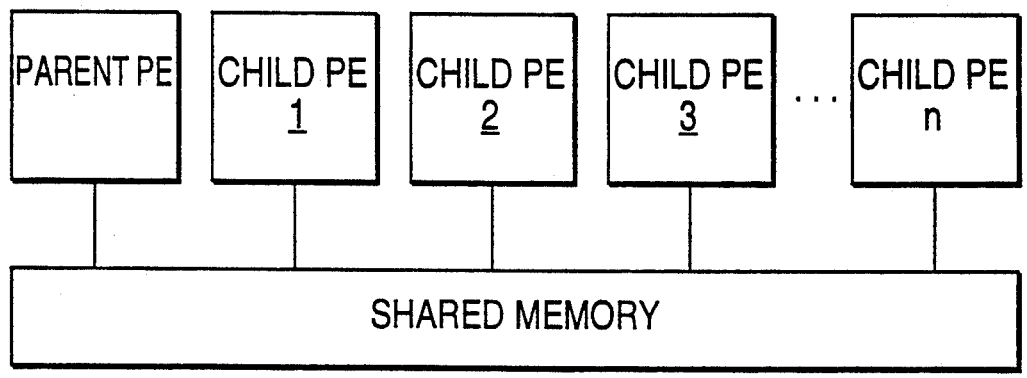
Figure 4C:
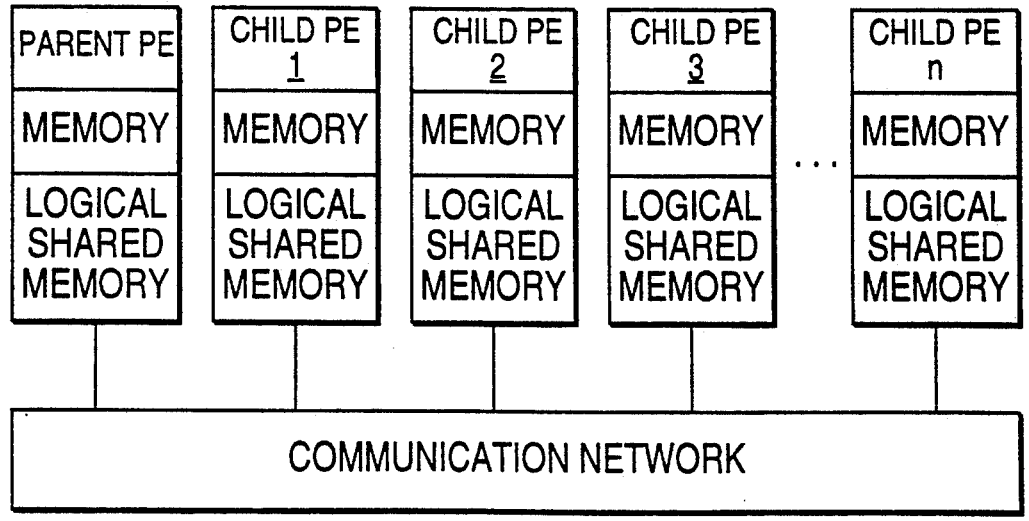

This invention can be applied to any type of parallel computer systems. It can be applied, for example, to a distributed-memory type parallel computer system connected via a communication network, as shown in FIG. 4A, or to a shared-memory type parallel computer system using a memory in common, as shown in FIG. 4B, or to a hybrid type parallel computer system having physical or logical shared memories connected via a communication network, as shown in FIG. 4C. Symbol PE in the figure denotes a processor element.

Figure 5:
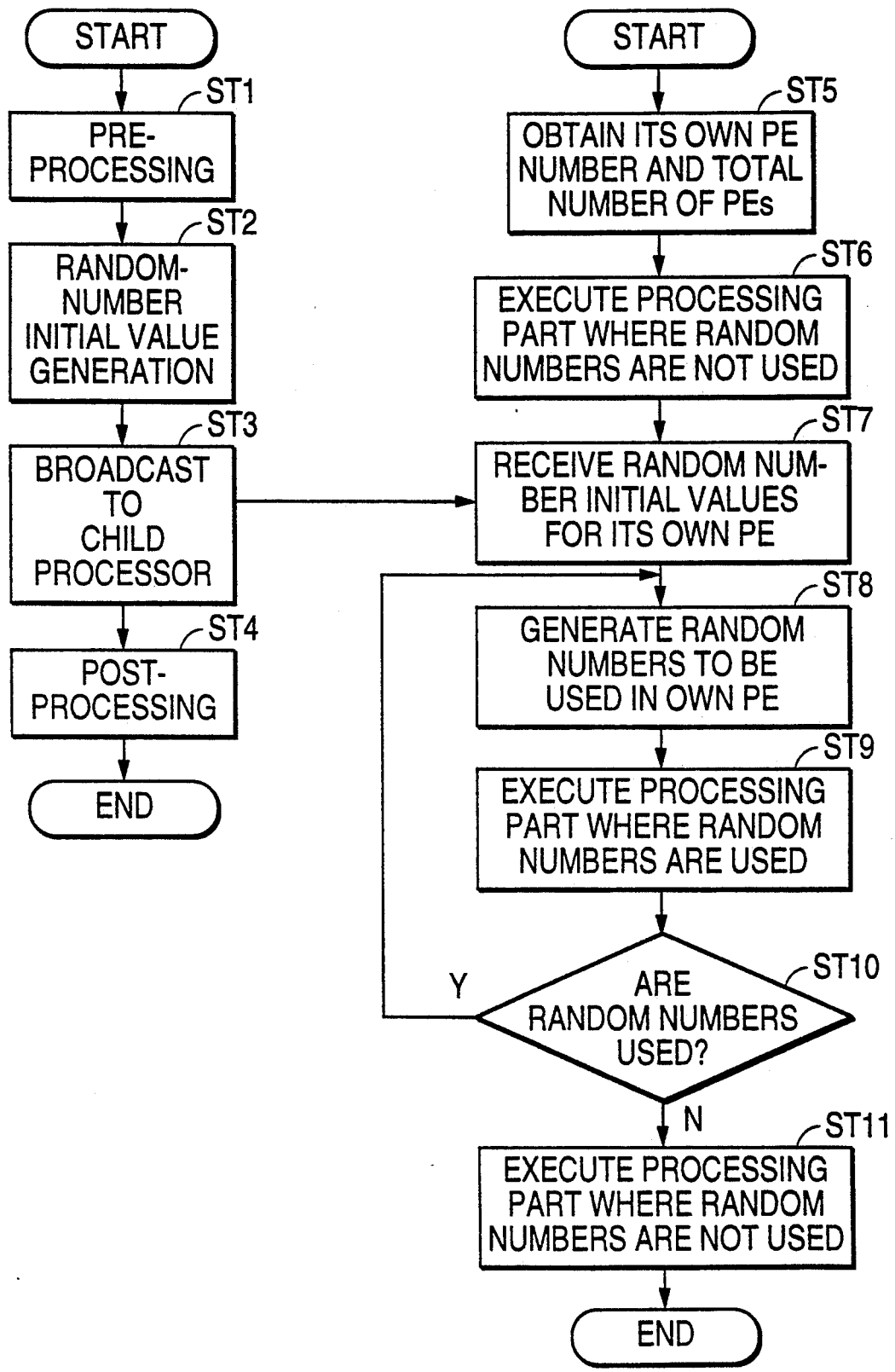
FIG. 5 shows an example of the entire process flow of the generation of random-number sequences of this invention.

FIG. 5 shows the entire process flow executed by the parent processor element 1 and the child processor elements 2-*i*, as described in relation to FIG. 1. The left side of the figure indicates the processing executed by the parent processor element 1, and the right side indicates the processing executed by the child processor elements 2-*i*.

As shown in the figure, the parent processor element 1 first executes preprocessing in Step 1 for generating random-number initial values that serve as seeds for random-number sequences generated in the child processor elements 2-*i*, and generates those random-number initial values in Step 2. In Step 3, the generated random-number initial values are broadcast to the child processor elements 2-*i* via a communication network, etc., and finally in Step 4, postprocessing is executed to complete the entire processing.

The child processor elements 2-*i*, on the other hand, first receive in Step 5 the information on the processor number of its own element and the information on the total number of the child processor elements from the operating system. Then, after that part of processing not involving the use of random numbers is executed in Step 6, the random-number initial values allocated to it are received from among the random-number initial values transferred from the parent processor element 1 in Step 7.

In Step 8, the random-number sequences to be used by its own element are generated using the received random-number initial values, and that part of processing involving the use of the generated random-number sequences is executed in Step 9. Then, whether or not there is a request for the use of random numbers is judged (i.e., determined) in Step 10. If there is a request for using random numbers in the Step-10 judgment, processing is returned to Step 8, and if there is no request for using random numbers, processing proceeds to Step 11 where that part of processing not involving the use of random numbers is executed to complete the entire processing.

Figure 6:
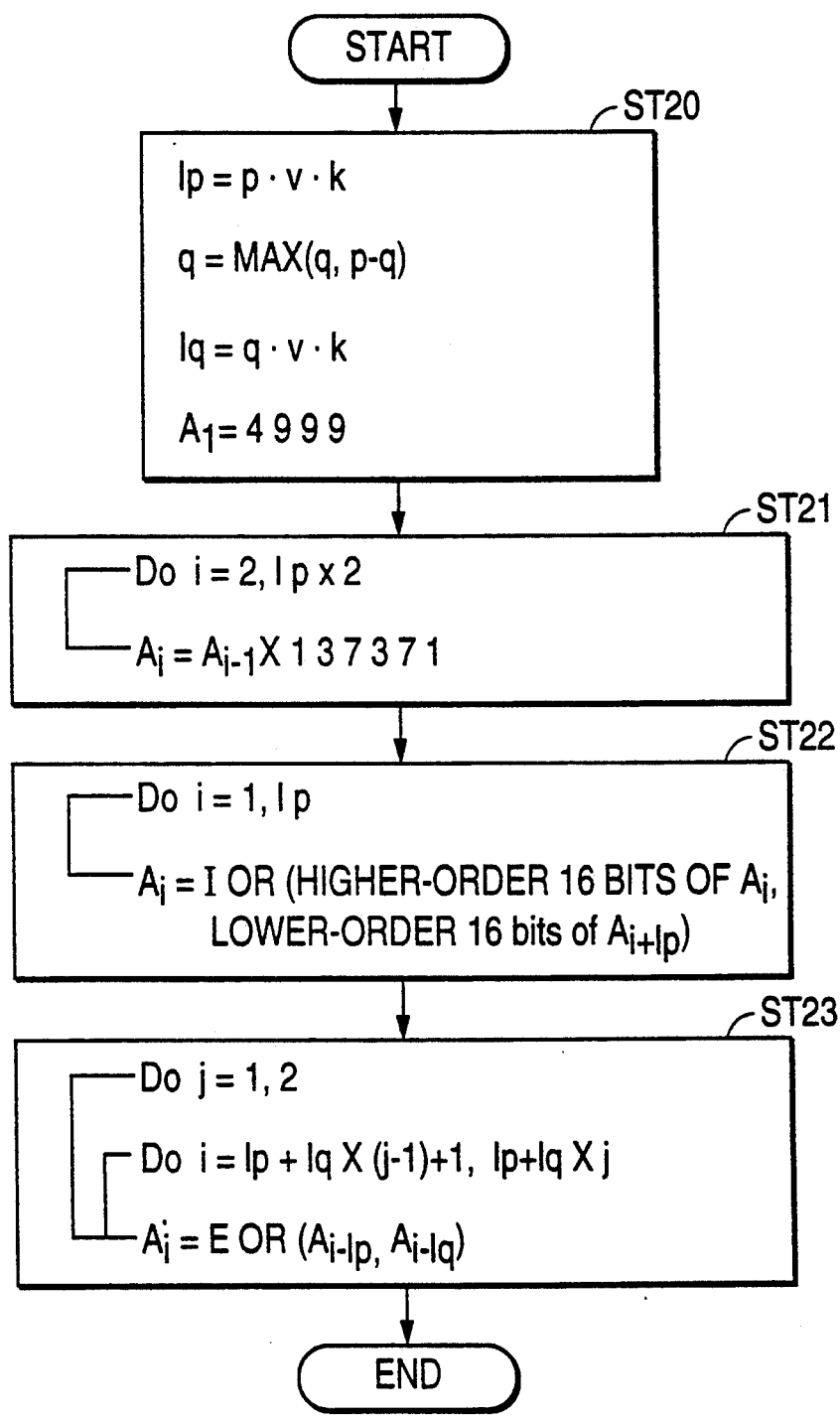
FIG. 6 shows an example of the flow of the generation of random-number initial values executed by a parent processor element.

FIG. 6 shows the detailed process flow of generating random-number initial values executed by the parent processor element 1.

When generating random-number initial values, the parent processor element 1 first sets "p×v×k" as the variable $1_p$ in Step 20, as shown in the process flow of FIG. 6, and then sets q or (p−q), whichever is the greater, as a new q value (that had previously been described as r). Furthermore, the parent processor element 1 sets "q×v×k" as the variable $1_q$ in accordance with this new q, and "4999" as the variable $A_1$. As noted earlier, p and q are defined as parameters of the primitive irreducible polynominal "$X^p+X^q+1$" that prescribes the M-sequence random-number generation, and v is defined as a value obtained by raising 2 to the n-th power (n=a natural number). If the vector length of the vector operating mechanisms of the child processor elements 2-*i* is expressed by α, the value k satisfying the condition "q×v>α" is the number of child processor elements 2-*i* generating random numbers.

Next, $A_i$ (i=2∼2×$1_p$) values are calculated in Step 21 in accordance with:

$$A_i = A_{i-1} \times 137,371.$$

Thus, $2\times l_p$ pieces of $A_i$ ($i=1\sim 2\times l_p$) values are determined from this calculation processing and the $A_1$ that is set to "4999."

Then, one of $A_i$ in the range of $i=1\sim l_p$ is selected in Step 22, and $A_{i+lp}$ corresponding to it is also selected, and the processing for replacing the selected $A_i$ with a new one by combining the higher-order 16 bits of the selected $A_i$ with the lower-order 16 bits of the selected $A_{i+lp}$ is executed. That is, $l_p$ pieces of new $A_i$ ($i=1\sim l_p$) values are generated by mixing $A_i$ with $A_{i+lp}$. The method of generating random numbers up to the $l_p$ numbers is in accordance with the multiplicative or mixed congruential (MC-sequence) method.

In Step 23, $A_{lp+1}$ is calculated in accordance with bit-by-bit exclusive-OR operation of $A_1$ and $A_{lp+1-lq}$, and $A_{lp+2}$ is calculated in accordance with bit-by-bit exclusive-OR operation of $A_2$ and $A_{lp+2-lq}$, using $A_i$ ($i=1\sim l_p$) generated in Step 22, in accordance with the M-sequence random-number sequence generating method, and in accordance with $$A_i = \text{EOR}\,(A_{i-lp},\, A_{i-lq})$$

where EOR is bit-by-bit exclusive-OR operation.

In this way, by repeating the calculations of $A_{lp+k}$ in accordance with bit-by-bit exclusive-OR operation of $A_k$ and $A_{lp+k-lq}$, newly defined $A_i$ ($i=l_p+1\sim l_p+2\times l_q$) values are determined.

These repeated calculations are possible up to "$k=l_q$" where the equation $l_p+k-l_q=l_p$ holds as the first stage of calculation is made by using $A_i$ ($i=1\sim l_p$) generated in Step 22 since the last number of $A_i$ generated in Step 22 is $A_{lp}$. That is, new $A_i$ ($i=l_p+1\sim l_p+l_q$) values are generated in the first stage, using $A_i$ ($i=1\sim l_p$) generated in Step 22.

Next, in the second stage where the calculation is performed by including the newly generated $A_i$ ($i=l_p+1\sim l_p+l_q$), calculation is possible up to "$k=2\times l_q$" where the equation $l_p+k-l_q=l_p+l_q$ holds, since the last number of $A_i$ generated in the second stage is $A_{lp+lq}$. That is, in the second stage, new $A_i$ ($i=l_p+l_q+1\sim l_p+2\times l_q$) values are generated following the values generated in the first stage, including $A_i$ ($i=l_p+1\sim l_p+l_q$) generated in the first stage.

In this way, additionally mixed $A_i$ values are determined in this Step 23 by calculating newly defined $A_i$ ($i=l_p+1\sim l_p+2\times l_q$) values from the $A_i$ ($i=1\sim l_p$) generated in Step 22.

As will be described later, those actually used as random-number initial values are $A_i$ ($i=2\times l_q+1\sim l_p+2\times l_q$) which are $l_p$ pieces behind this determined $A_i$ ($i=l_p+1\sim l_p+2\times l_q$).

Thus, the parent processor element 1 generates random-number initial values by executing the process flow shown in FIG. 6.

$p\times v$ pieces each of the generated random-number initial values are distributed to k pieces of the child processor elements 2-$i$ in accordance with a predetermined rule, taking care to avoid overlapping. There can be various distributing methods, such as that of taking $p\times v$ pieces of random-number initial values from the top of $l_p$ ($=p\times v\times k$) pieces of the generated initial values to sequentially distribute to each child processor element 2-$i$, for example, or that of taking random-number initial values one by one from the top of $l_p$ pieces of the generated random-number initial values, as shown in FIG. 7.

In this way, the parent processor element 1 distributes a combination of $p\times v$ pieces of random-number initial values, that do not overlap with each other, to the child processor elements 2-$i$.

Figure 8:
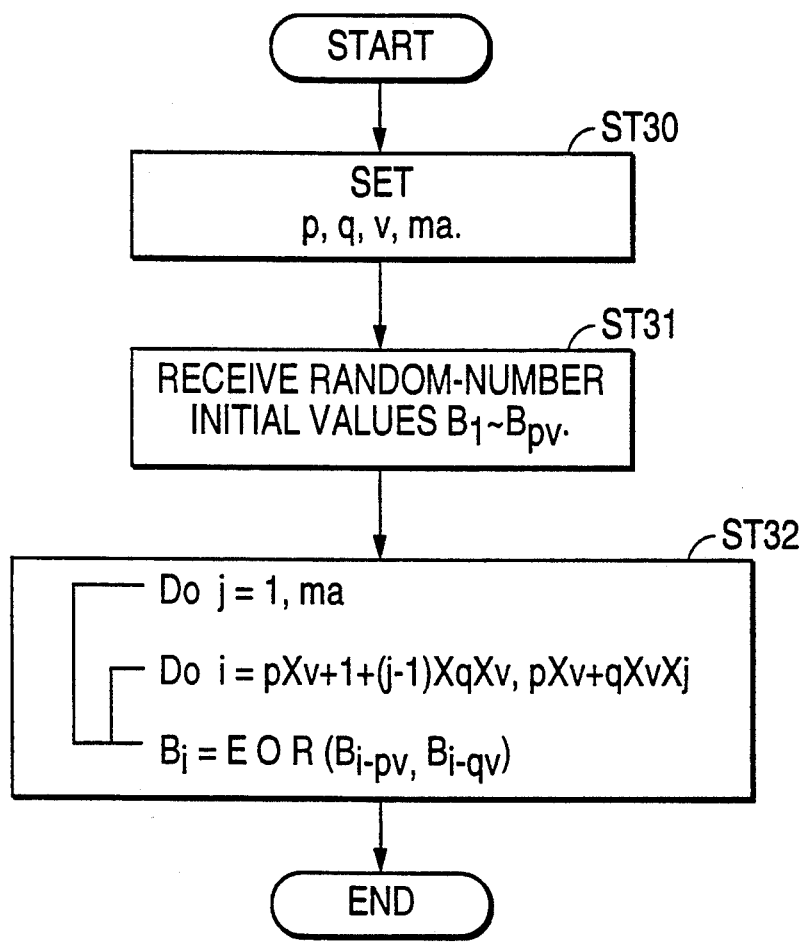
FIG. 8 shows an example of the flow of the generation of random-number sequences to be executed by the child processor elements.

Each child processor element 2-$i$ generates random-number sequences required for data processing in accordance with the process flow shown in FIG. 8, using $p\times v$ pieces of random-number initial values addressed to its own element as notified by the parent processor element 1.

That is, the child processor element 2-$i$ first sets p, q, v and ma values in Step 30. As described in the process flow shown in FIG. 6, p is defined as a parameter of the primitive irreducible polynomial "$X^p+X^q+1$" conceived by the parent processor element 1, q as parameter q or (p−q), whichever is the larger, of this primitive irreducible polynomial, v is a value obtained by raising to the n-th power (n=a natural number), or a value satisfying the condition "$q\times v>\alpha$" if the vector length of the vector operating mechanisms of the child processor elements 2-$i$ is expressed by $\alpha$, k as the number of the child processor elements 2-$i$ generating random numbers, and ma is a natural number prescribing the amount of random numbers to be generated.

Next, $p\times v$ pieces of random-number initial values are notified by the parent processor element 1 in Step 31. Hereinafter $p\times v$ pieces of the received random-number initial values will be written as $B_i$ ($i=1\sim p\times v$) for the sake of brevity.

In Step 32, $B_{pv+1}$ is calculated in accordance with the bit-by-bit exclusive-OR operation of $B_1$ and $B_{pv+1-qv}$, and $B_{pv+2}$ is calculated in accordance with the bit-by-bit exclusive-OR operation of $B_2$ and $B_{pv+2-qv}$, using the random-number initial value $B_i$ ($i=1\sim p\times v$) received in Step 31 in accordance with the same recurrence formula as the aforementioned Eq. (3) derived by expanding the maximum length shift register sequence (M-sequence) method.

$$B_i = \text{EOR}\,(B_{i-pv},\, B_{i-qv}) \qquad \text{Eq. (4)}.$$

By repeating these calculations until $B_{pv+maqv}$ is obtained, new random-number sequences $B_i$ ($i=p\times v+1\sim p\times v+ma\times q\times v$) are generated.

More specifically, the calculation processing of the random-number sequences $B_i$ ($i=p\times v+1\sim p\times v+ma\times q\times v$) is carried out by calculating $B_i$ ($i=p\times v+1\sim p\times v+q\times v$) in the first stage, calculating $B_i$ ($i=p\times v+1+q\times v\sim p\times v+2\times q\times v$) in the second stage, calculating $B_i$ ($i=p\times v+1+2\times q\times v\sim p\times v+3\times q\times v$) in the third stage, and up to the ma stage, in accordance with the vector operating mechanism of the child processor element 2-$i$.

In this way, by using the recurrence formula of Eq. (4), the child processor elements 2-$i$ can generate random-number sequences at high speed, making full use of the vector operating mechanism of its own element. It is for this reason that this invention generates random-number sequences using the expanded recurrence formula of Eq. (4), not by using general Eq. (1) or the recurrence formula of Eq. (2) that prescribe the M-sequence random-number sequence generating method. This has previously been described in detail in the description of the reason for the introduction of the recurrence formula of Eq. (3).

To describe this more exactly, the child processor elements 2-$i$ carry out processing so that each generates randon-number sequences in increments of the vector length α of the vector operating mechanism, as will be described later, instead of generating random-number sequences in increments of q×v pieces at each stage, in Step 32 of the process flow in FIG. 8, Thus, this invention employs such a configuration that long-period, non-correlated random-number sequences can be generated at high speed because each child processor element 2-$i$ of a parallel computer system generates randon-number sequences in accordance with the expanded M-sequence method, while making the full use of the vector operating mechanism.

FIGS. 9 through 12 show examples of detailed programs for implementing the aforementioned process flow.

FIG. 9 shows an example of a program for implementing the generation of random-number initial values to be executed by the parent processor element 1; FIG. 10 shows an example of a program for implementing the transfer of random-number initial values to be executed by the parent processor element 1; FIG. 11 shows an example of a program for implementing the receiving of random-number initial values to be executed by the child processor elements 2-$i$; and FIG. 12 shows an example of a program for implementing the generation of random-number sequences to be executed by the child processor elements 2-$i$.

In the following, the contents of these programs will be described.

In the program shown in FIG. 9 for implementing the process flow shown in FIG. 6, the part ① is a program portion corresponding to Step 20 in the process flow of FIG. 6, which instructs the setting of various parameter information. In this program portion, the value k is set to "$2^{10}$", that is, the number of the child processor elements 2-$i$ is set to 1024, the value p is set to "284," and the value q at "143."

Since r=MAX (q, p−q)=q=143. in accordance with the value q, this value q is used as a new value q. Furthermore, in view of the fact that the newly defined q must satisfy:

$$q \times p > 512$$

given that the vector length α of the vector operating mechanism of the child processor element 2-$i$ is "512," the value v is set to "$2^2 = 4$."

In part ① of FIG. 9, $l_p$ and $l_q$, and the sequence "IRANSU" are defined as 4-byte data items, and it is set that the maximum ($l_p + 2 \times l_q$) pieces of data values are stored, as described in Step 23 of the process flow of FIG. 6. The value of the variable "TANE" prescribing the value $A_1$ is set to "4999" and the data IX having a value of "FF00", used for extracting the higher-order 16 bits of $A_i$, and the data IY having a value of "00FF", used for extracting the lower-order 16 bits of $A_{i+lp}$, are also set.

In the program shown in FIG. 9, the part ② is a program portion corresponding to Step 21 of the process flow of FIG. 6, which calculates $2 \times l_p$ pieces of $A_i$ ($i = 1 \sim 2 \times l_p$) values to store them sequentially from the top of the sequence IRANSU in accordance with:

$$A_i = A_{i-1} \times 137{,}371.$$

The part ③ is a program portion corresponding to Step 22 of the process flow of FIG. 6, which extracts the higher-order 16 bits of $A_i$ by the bit-by-bit AND operation of the $A_i$ ($i = 1 \sim l_p$) stored in the data IX and the sequence IRANSU, extracts the lower-order 16 bits of $A_i$ by the bit-by-bit AND operation of the $A_{i+lp}$ ($i = 1 \sim l_p$) stored in the data IY and the sequence IRANSU, and calculates $l_p$ pieces of new $A_i$ ($i = 1 \sim l_p$) values in accordance with the bit-by-bit OR operation of the extracted higher-order 16 bits of $A_i$ and the lower-order 16 bits of $A_{i+lp}$ thereby to store them sequentially, from the top of the sequence IRANSU.

The part ④ is a program portion corresponding to Step 23 of the process flow of FIG. 6, which calculates $A_{lp+1}$ in accordance with the bit-by-bit exclusive-OR operation of the $A_1$ and $A_{lp+1-lq}$ stored in the sequence IRANSU to store them in the "$l_p+1$"-th element of the sequence IRANSU, calculates $A_{lp+2}$ in accordance with the bit-by-bit exclusive-OR operation of the $A_2$ and $A_{lp+2-lq}$ stored in the sequence IRANSU to store them in the "$l_p+2$"-th element of the sequence IRANSU, and finally calculates $A_{lp+2lq}$ in accordance with the bit-by-bit exclusive-OR operation of the $A_{2lq}$ and $A_{lp+lq}$ stored in the sequence IRANSU to store them in the "$l_p+2 \times l_q$"-th element of the sequence IRANSU. Thus, the part ④ is a program portion for storing $2 \times l_q$ pieces of new $A_i$ ($i = l_p+1 \sim l_p+2 \times l_q$) in the "$l_p+1$"-th element to the "$l_p+2 \times l_q$"-th element of the sequence IRANSU.

As is evident from the contents of the program of FIG. 9 described above, the parent processor element 1 generates random-number initial values in accordance with the multiplicative or mixed congruential (MC-sequence) method and the maximum length shift register sequence (M-sequence) method by executing the program of FIG. 9.

The random-number initial values generated by the parent processor element 1 are distributed regularly by p×v pieces to the child processor elements 2-$i$ in accordance with the programs shown in FIGS. 10 and 11. The distributing programs shown in FIGS. 10 and 11 employ such a method that the parent processor element 1 arranges and notifies the random-number initial values generated to all the child processor elements 2-$i$, and that the child processor elements 2-$i$ selectively receive in accordance with a predetermined rule the random-number initial values distributed to them.

The program shown in FIG. 10 is a program executed by the parent processor element 1, which instructs the transfer of the designated random-number initial values in the generated sequence IRANSU to all the child processor elements 2-$i$. The first argument of the SEND instruction of the subroutine executing transfer processing represents the leading address of the sequence to be transferred, and the second argument the number of bytes to be transferred from the leading address.

In this program, it is disclosed that starting from the "$2 \times l_q+1$"-th random-number initial value of the sequence IRANSU, $l_p$ pieces of random-number initial values (the data length of one random-number initial value is 4 bytes) from that top random-number initial value are transferred to all the child processor elements 2-$i$. That is, the parent processor element 1 transfers $l_p$ pieces of random-number initial values $A_i$ from behind the random-number initial values $A_i$ ($i = l_p+1 \sim l_p+2 \times l_q$) generated by the program of FIG. 9 to all the child processor elements 2-$i$.

On the other hand, the program of FIG. 11, which implements the processing of Step 31 in the process flow shown in FIG. 8, is a program which is executed by the child processor elements 2-$i$, and issues instructions to each processor element to selectively receive the random-number initial values distributed to its own element from the random-number initial values transferred from the parent processor element 1.

The first argument of the RECV instruction of the sub-routine in the part ④ for executing receiving processing represents the top address of the sequence in which the received random-number initial values are stored. The second argument represents the number of bytes up to the start of receiving in the X direction (in the direction of processor number in FIG. 7). The third argument represents the number of bytes from the preceding received part to the next received part in the X direction. The fourth argument represents the number of bytes owned by a unit of the X-direction received part. For example, it indicates that four bytes are one unit of received parts. The fifth argument represents the total number of bytes in the part received in the X-direction. For example, it indicates that four bytes when the total number of units is one unit.

The sixth argument represents the number of lines of the start-to-receive part in the Y direction (another direction in FIG. 7). The seventh argument represents the number of lines from the preceding received part to the next received part in the Y direction. If it is zero, it indicates a continuous line. The eighth argument represents the number of lines owned by one unit of the part received in the Y-direction. If it is 1, it indicates that the received part exists in one line. The ninth argument represents the total number of lines in the part received in the Y direction. For example, when $p \times v$ pieces are received, it indicates $p \times v$.

The program shown in FIG. 11 is complex because of its general-purpose configuration, but a simpler program can implement a special-purpose configuration.

In this program, it is disclosed that the part ① defines the parameter information and the sequence IR storing $p \times v$ pieces of received random-number initial values, then the part ② obtains its own processor element number ncid, the part ③ obtains the total number k of the child processor elements, and the RECV instruction of the part ④ sequentially receives up to $p \times v$ pieces of random-number initial values, by skipping k pieces from the top random-number initial values designated by its own processor element number ncid. With this program, each child processor element 2-i receives the random-number initial values transferred by the parent processor element 1 in accordance with the process shown in FIG. 7.

In the program of FIG. 12 executing the processing of Step 32 in the process flow shown in FIG. 8, the part ① is a program portion for instructing the setting of various parameter information. In this program portion, the value ma is set to "3," and the value p is set to "284," the value q to "143" and the value v to "4" corresponding to the program shown in FIG. 9. Moreover, the sequence IR in which $p \times v$ pieces of received random-number initial values are stored, and the sequence JR in which $512 \times ma$ pieces of generated random-number sequences are stored are defined. The maximum vector length making vector operation possible is $q \times v$ pieces, that is, 572 pieces, but the maximum storable capacity of the sequence JR is defined as $512 \times ma$ pieces in cases where the vector length $\alpha$ of the vector operating mechanism is optimized at 512, for example.

The program portion that implements the processing of Step 32 in the process flow shown in FIG. 8 is the part ②, which generates random-number sequences.

The calculation of random-number sequences here is such that in the first stage, "$i = p \times v + 1 \sim p \times v + 512$" pieces are calculated using "$B_i = EOR (B_{i-pv}, B_{i-qv})$," or more specifically in accordance with the vector operating mechanism of the child processor element 2-i. In the second stage, "$i = p \times v + 1 + 512 \sim p \times v + 2 \times 512$" pieces are calculated, then "$i = p \times v + 1 + 2 \times 512 \sim p \times v + 3 \times 512$" pieces are calculated in the third stage, and this calculation is carried out up to the ma-th stage using the vector length $\alpha$ (512 in this case) of the vector operating mechanism.

The program of the part ③ is provided so that the top bit value indicating a code is always kept indicating "0," that is, positive by shifting the generated random-number value rightward by one bit. When a random number from "0" to "1" is used, the processing of dividing the elements of the sequence JR storing the generated random-number sequences by $2^{31}$ is carried out.

In this way, random-number generation of this invention is implemented in accordance with the program examples shown in FIGS. 9 through 12.

As described above, this invention employs such a configuration that each child processor element 2-i of a parallel computer system generates random-number sequences in accordance with the maximum length shift register sequence (M-sequence) method. By adopting the M-sequence random-number sequence generating method, each child processor element 2-i can generate random-number sequences having such a period as long as $(2^P - 1)$ at its maximum, and generates random-number sequences that are not correlated with each other, without such a difficulty as multiplicative or mixed congruential (MC-sequence) method.

Since a configuration of making the maximum use of the vector operating mechanisms in applying the maximum length shift register sequence (M-sequence) method, the child processor elements 2-i can generate random-number sequences at high speed. And yet, this high-speed random-number sequence generation can be positively performed because communication processing between the parent processor element 1 and the child processor elements 2-i is not requested except for the transfer of random-number initial value data. In addition, adoption of the configuration described with reference to FIG. 3 can implement a configuration requiring no communication processing for generating random numbers between processor elements 3-i.

What is claimed is:

1. A method of generating random-number sequences in a parallel computer system comprising a plurality of processor elements, said method comprising:

defining a first set of processor elements required to generate random numbers and defining a second set of processor elements, coupled to said first set of processor elements and operable for generating random-number initial values;

generating, by one of said second set of processor elements, $p \times v \times k$ pieces of random-number initial values, wherein p is a parameter of a primitive irreducible polynomial prescribing random-number generation, v is a predetermined value not less than 1, and k is a number of said first set of processor elements allocating to said first set of processor elements respective random-number initial values; and generating random numbers $A_n$, by one of said first set of processor elements, through bit-by-bit logical operation of random-number values $A_{n-pv}$ and $A_{n-rv}$ using p×v pieces allocated thereto from said p×v×k pieces of said generated random-number initial values, wherein q is defined as a parameter of a primitive irreducible polynomial prescribing random-number generation, r is defined as one of q and (p−q), and n is defined as being greater than or equal to p×v+1.

2. A method of generating random-number sequences in a parallel computer system as set forth in claim 1 wherein said bit-by-bit logical operation is an exclusive-OR operation.

3. A method of generating random-number sequences in a parallel computer system as set forth in claim 1, wherein r is defined as the greater value one of q and (p−q).

4. A method of generating random-number sequences in a parallel computer system as set forth in claim 1, wherein if a vector length of a vector operating mechanism of one of said first set of processor elements is expressed by $\alpha$, v is selected from among values (r×v) which are larger than $\alpha$.

5. A method of generating random-number sequences in a parallel computer system as set forth in claim 4 wherein v is selected as the minimum value greater than $\alpha$ from among values (r×v).

6. A method of generating random-number sequences in a parallel computer as set forth in claim 4 wherein one of said first set of processor elements generates random-number sequences in increments of said vector length $\alpha$ of said vector operating mechanism.

7. A method of generating random-number sequences in a parallel computer system as set forth in claim 1 wherein v is an exponentiated-2 value.

8. A method of generating random-number sequences in a parallel computer system as set forth in claim 1 wherein one of said second set of processor elements generates random-number initial values using one of the maximum length shift register sequence (M-sequence) method singly, and a combination of the M-sequence random-number sequence generating method and mixed congruential sequence generating method.

9. A method of generating random-number sequences in a parallel computer as set forth in claim 1 wherein one of the second set of processor elements is configured to function as one of the first set of processor elements.

10. A method of generating random-number sequences in a parallel computer as set forth in claim 1 wherein one of the second set of processor elements arranges and transfers generated random-number initial values to one of the first set of processor elements using communication means coupled to said plurality of processor elements, said one of the second set of processor elements obtains random initial values by selectively receiving random-number initial values allocated to said one of the second set of processor elements in accordance with a predetermined regularity from among said transferred random-number initial values.

11. A method of generating random-number sequences in a parallel computer system as set forth in claim 1 wherein one of a second set of processor elements writes generated random-number initial values into a shared memory area, coupled to said plurality of processor elements, that can be accessed by other of said plurality of processor elements, and one of a first set of processor elements obtains random-number initial values by accessing the shared memory area, and selectively reads random-number initial values allocated to said one of said first set of processor elements.

12. A method of generating random-number sequences in a parallel computer system comprising a plurality of processor elements, interconnected and generating random-number initial values, said method comprising:

defining a first set of processor elements, selected from said plurality of processor elements and each thereof required to generate random numbers;

generating p×v×k pieces of random-number initial values, by each of said plurality of processor elements and in accordance with a first algorithm wherein p is a parameter of a primitive irreducible polynomial prescribing random-number generation, v is a predetermined value not less than 1, and k is a number of said first set of processor elements;

allocating to said first set of processor elements respective said random-number initial values;

extracting, by said first set of processor elements, p×v pieces of the respective random-number initial values allocated thereto; and generating, by said first set of processor elements, random numbers $A_n$ through bit-by-bit logical operation of random-number values $A_{n-pv}$ and $A_{n-rv}$ using p×v pieces of said extracted random-number initial values, wherein if q is defined as a parameter of a primitive irreducible polynomial prescribing random-number generation, r is defined as one of q and (p−q), and n is $\geq$ p×v+1.

13. A method of generating random-number sequences in a parallel computer system as set forth in claim 12 wherein said bit-by-bit logical operation is an exclusive-OR operation.

14. A method of generating random-number sequences in a parallel computer system as set forth in claim 12 wherein r is defined as the greater value one of q and (p—q).

15. A method of generating random-number sequences in a parallel computer system as set forth in claim 12 wherein if a vector length of a vector operating mechanism of one of said first set of processor elements is expressed by $\alpha$, v is selected from among values (r×v) which are larger than $\alpha$.

16. A method of generating random-number sequences in a parallel computer system as set forth in claim 12 wherein v is an exponentiated-2 value.

17. A method of generating random-number sequences in a parallel computer system as set forth in claim 12 wherein one of said plurality of processor elements generates random-number initial values using one of the maximum length shift register sequence (M-sequence) method singly, and a combination of the M-sequence random-number sequence generating method and mixed congruential sequence generating method.

* * * * *